United States Patent
Lei et al.

(10) Patent No.: US 8,856,757 B2
(45) Date of Patent: *Oct. 7, 2014

(54) AUTOMATIC LICENSE ENTITLEMENT CALCULATION

(71) Applicant: International Business Machines Corporation, Armonk, NY (US)

(72) Inventors: Hui Lei, Scarsdale, NY (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,157

(22) Filed: Nov. 8, 2012

(65) Prior Publication Data

US 2014/0130024 A1   May 8, 2014

(51) Int. Cl.
*G06F 9/45* (2006.01)
*G06F 21/10* (2013.01)

(52) U.S. Cl.
CPC .............. *G06F 21/105* (2013.01); *G06F 8/41* (2013.01)
USPC ........... 717/139; 717/136; 717/140; 717/146; 717/153

(58) Field of Classification Search
CPC ............. G06Q 30/018; G06Q 30/0281; G06F 9/44521
See application file for complete search history.

(56) References Cited

U.S. PATENT DOCUMENTS

| | | | |
|---|---|---|---|
| 6,957,186 B1 | 10/2005 | Guheen et al. | |
| 8,396,807 B1 * | 3/2013 | Yemini et al. | 705/59 |
| 2002/0107809 A1 | 8/2002 | Biddle et al. | |
| 2004/0039916 A1 * | 2/2004 | Aldis et al. | 713/177 |
| 2004/0249763 A1 * | 12/2004 | Vardi | 705/59 |
| 2005/0125358 A1 | 6/2005 | Levin et al. | |
| 2006/0242081 A1 | 10/2006 | Ivanov et al. | |
| 2007/0033395 A1 * | 2/2007 | MacLean | 713/157 |
| 2007/0094145 A1 * | 4/2007 | Ta et al. | 705/59 |
| 2008/0040619 A1 * | 2/2008 | Dublish et al. | 713/193 |
| 2010/0017879 A1 * | 1/2010 | Kuegler et al. | 726/23 |
| 2010/0030627 A1 * | 2/2010 | Lee et al. | 705/11 |
| 2011/0010304 A1 | 1/2011 | Chan Wong et al. | |
| 2011/0154330 A1 | 6/2011 | Axnix et al. | |
| 2011/0196793 A1 * | 8/2011 | Zheng et al. | 705/50 |
| 2011/0246382 A1 | 10/2011 | Allen | |
| 2011/0296429 A1 * | 12/2011 | Segmuller et al. | 718/104 |
| 2013/0019002 A1 * | 1/2013 | Heileman et al. | 709/223 |
| 2013/0185197 A1 * | 7/2013 | Brown et al. | 705/39 |
| 2013/0276138 A1 | 10/2013 | Schmelzer | |

* cited by examiner

*Primary Examiner* — Chameli Das
(74) *Attorney, Agent, or Firm* — Ryan, Mason & Lewis, LLP

(57) ABSTRACT

Techniques for automatic license entitlement calculation. A method includes decomposing a license metric definition into metric-generic and metric-specific logic, compiling the metric-specific logic to generate intermediate code, interpreting the metric-generic logic and dynamically loading the intermediate code to execute a license entitlement calculation.

12 Claims, 8 Drawing Sheets

AUTOMATIC LICENSE ENTITLEMENT CALCULATION

CROSS-REFERENCE TO RELATED APPLICATIONS

The present application is related to U.S. patent application entitled "License Meta-Model for Automatic License Reasoning," identified by Ser. No. 13/661,718 and filed on Oct. 26, 2012, the disclosure of which is incorporated by reference herein in its entirety.

FIELD OF THE INVENTION

Embodiments of the invention generally relate to information technology, and, more particularly, to license management.

BACKGROUND

Existing license management systems can support only a limited set of license metrics. A low-level programming effort and run-time compilation and deployment are required when creating a new license metric and/or customizing an existing license metric. Accordingly, a need exists to automate license management systems so as to limit or preclude the need for such programming efforts. Also, existing license management systems lack support of dynamicity. For example, such a system cannot add new license metrics without stopping and restarting the system. Therefore, it is desirable to provide a mechanism that allows adding new license metrics on the fly during run-time.

SUMMARY

In one aspect of the present invention, techniques for automatic license entitlement calculation are provided. An exemplary computer-implemented method for implementing a model-driven license entitlement calculation can include steps of decomposing a license metric definition into metric-generic and metric-specific logic, compiling the metric-specific logic to generate intermediate code, interpreting the metric-generic logic and dynamically loading the intermediate code to execute a license entitlement calculation.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes automatic license entitlement calculation. At least one embodiment of the invention includes facilitating license entitlement calculation for new or customized license metrics without low-level programming. Also, new license metrics can be supported without stopping and restarting the calculation engine, and without recompiling the license calculation engine. Further, at least one embodiment of the invention includes enabling on-the-fly customization and/or modification on license metrics (requiring zero system downtime).

Accordingly, aspects of the invention include model-driven license calculation. At least one embodiment of the invention includes adopting a metamodel for defining a variety of software license metrics. This can include a set of constructs to specify information such as license capacity unit definition, license capacity calculation, etc. Further, license entitlement calculation can include the use of an editor component for creating a new license metric definition, a model adaptor that enables importing license metric definitions in multiple formats, and a validator component that validates the license metric definition.

As additionally detailed herein, a license calculator such as described in an embodiment of the invention, calculates license entitlements by providing input in the form of a license metric definition, software type identifier (Software_ID) and software deployment domain type and its identifier (ID). Such an embodiment of the invention can include calculating a capacity unit in a default domain by interpreting capacity unit definition logic, as well as calculating capacity in a default domain by interpreting capacity definition logic. Additionally, such calculation results can be aggregated to a required deployment domain, if necessary.

Figure 1:
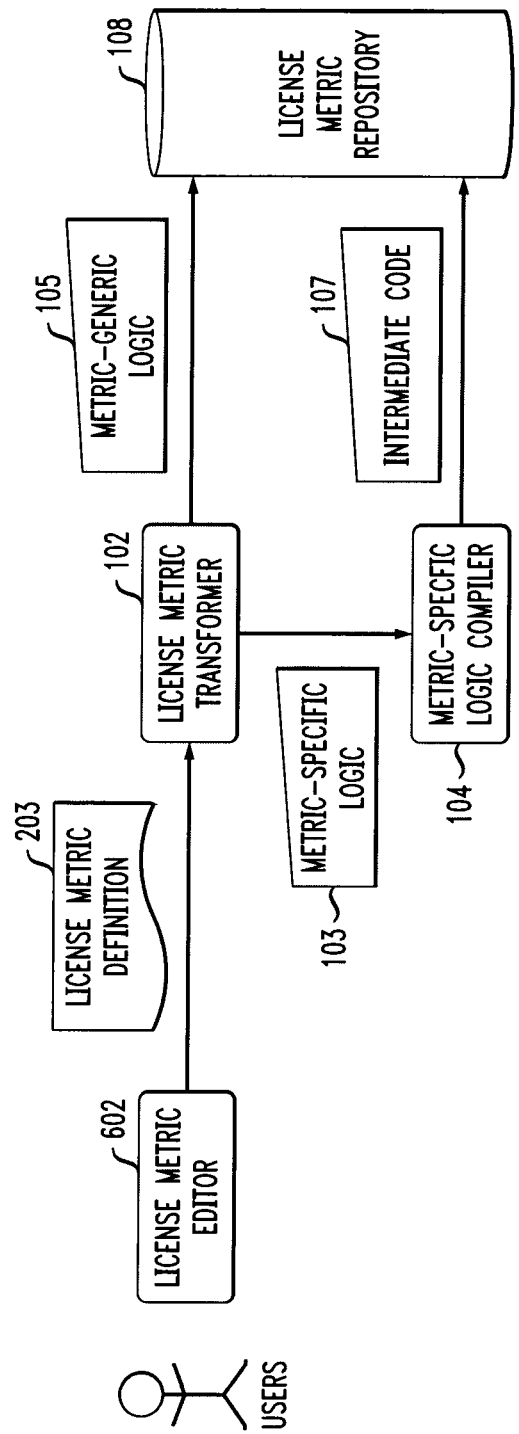
FIG. 1 is a diagram illustrating definition and deployment of a new license metric definition, according to an embodiment of the present invention.

FIG. 1 is a diagram illustrating definition and deployment of a new license metric definition, according to an embodiment of the present invention. As additionally described herein, FIG. 1 depicts a license metric editor component 602, which provides a license metric definition 203 to a license metric transformer module 102. The license metric transformer module 102 provides metric-specific logic 103 to a metric-specific logic compiler component 104, and also provides metric-generic logic 105 to a license metric repository. Further, the metric-specific logic compiler component 104 provides intermediate code 107 to the license metric repository 108.

Figure 2:
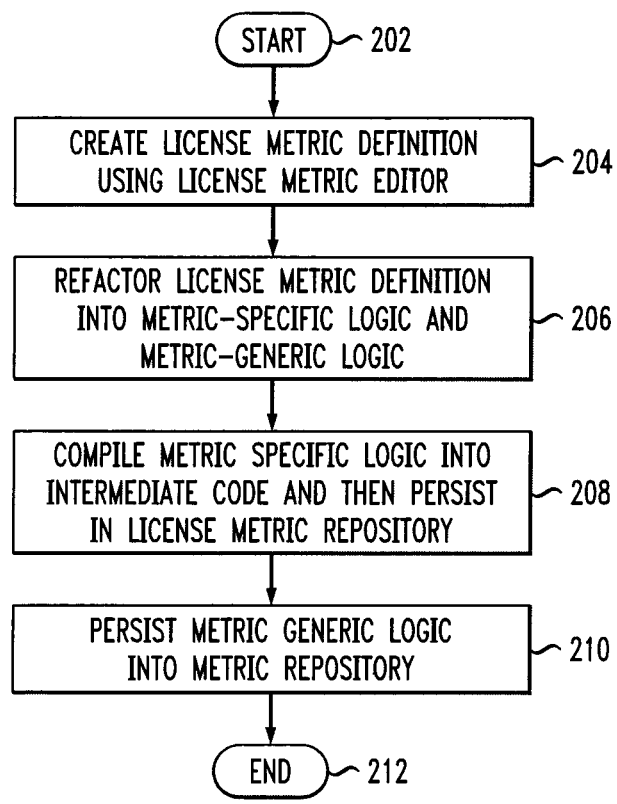
FIG. 2 is a flow diagram illustrating techniques for new license metric deployment, according to an embodiment of the present invention.

FIG. 2 is a flow diagram illustrating techniques for new license metric deployment, according to an embodiment of the present invention. The process starts at step 202, and continues to step 204, which includes using (via a user) a license metric editor to create a new license metric definition. Step 206 includes re-factoring the license metric definition via a license metric transformer into two components: metric-specific logic and metric-generic logic. Metric-specific logic is specific to individual license metric definitions. An example of metric-specific logic can be the property function definitions that appear in a license capacity unit definition and a license capacity calculation definition.

Metric-generic logic is application logic that can apply to any other license metric definition. An example of metric-generic logic is an aggregation setting for a license entitlement calculation. In the definition of a property function, a default scope is given to indicate the scope that the property function can be applied to calculating license entitlements. The aggregation setting defines how a system should aggregate the calculation result from the default scope to a requested scope if the requested scope is larger than the default scope in the license capacity unit definition and license capacity calculation definition.

Additionally, in step 208, the metric-specific logic is forwarded to a metric-specific logic compiler and the metric-specific logic compiler generates intermediate code for metric-specific logic, which is persisted or stored in a license metric repository. In at least one embodiment of the invention, the intermediate code is binary code that can be invoked subsequently for license entitlement calculation. Further, in step 210, the metric-generic logic is persisted in the license metric repository, and the process ends at step 212.

As noted, an aspect of the invention includes generating intermediate code for property functions. As detailed herein, categories of property functions include formular-based functions, and table-based functions. Code generation for formular-based functions includes the following.

Uniformly, any formular-based function can be denoted as:

$$\lambda = \chi(\lambda_1, \lambda_2, \ldots, \lambda_n, \gamma_1, \gamma_2, \ldots, \gamma_m, \epsilon_1, \epsilon_2, \ldots, \epsilon_k, \epsilon_1, \epsilon_2, \ldots, \epsilon_l) \quad (1)$$

$\chi$ is the operator and there are four kinds of operands: component license metrics ($\lambda_i$), attributes ($\gamma_i$) in IT environment, external data source ($\epsilon_i$) and constant ($\epsilon_i$). Generating code for function execution can include two steps, as follows.

In the first step, the metric-specific logic compiler generates queries to retrieve every operand's value. Here, $\lambda_i$, the attribute in IT environment, is used as an example of operands to illustrate the code generation solution. By specifying an entity navigation path, the attribute $\lambda_i$ in expression (1) can be refined as:

$$\lambda_i = \lambda_i < c_{\lambda i1}, c_{\lambda i2}, \ldots, c_{\lambda in} > .\alpha_1 < c_{\alpha 11}, c_{\alpha 12}, \ldots, c_{\alpha 1n} >.$$

$$\alpha_2 < c_{\alpha 21}, c_{\alpha 22}, \ldots, c_{\alpha 2n} >, \ldots, \alpha_n < c_{\alpha n1}, c_{\alpha n2}, \ldots, c_{\alpha nn} > [i \ldots j] \quad (2)$$

In this expression, $c_{\lambda ij}$ (resp. $c_{\alpha ij}$) is a boolean expression for selecting instances of $\lambda_i$ (resp. $\alpha_i$), and [i ... j] is the array element specification. Then, the query that retrieves $\lambda_i$ is:

$$\delta c_{\lambda i1}, \hat{c}_{\lambda i2} \ldots \hat{c}_{\lambda in} \hat{c}_{\alpha 11} \hat{c}_{\alpha 12} \ldots \hat{c}_{\alpha 1n} \hat{c}_{\alpha 21} \hat{c}_{\alpha 22} \ldots \hat{c}_{\alpha 2n} \ldots \hat{c}_{\alpha n1} \hat{c}_{\alpha n2} \ldots \hat{c}_{\alpha nn} (R_1 \bowtie_{q_1} R_2 \bowtie_{q_2} \ldots \bowtie_{q_{k-1}} R_k) \quad (3)$$

In this query (represented using relational algebra), $q_i$ is the equal join predicate for $R_i$ and $R_{i+1}$, and $\bowtie$ is the join operator. In fact, $q_i$ is defined by an attribute lookup in an IT environment model, $\delta$ is a selection operator and $\delta c_{\lambda i1}, \hat{c}_{\lambda i2} \ldots \hat{c}_{\lambda n2} \hat{c}_{\alpha 11} \hat{c}_{\alpha 12} \ldots \hat{c}_{\alpha 1n} \hat{c}_{\alpha 21} \hat{c}_{\alpha 22} \ldots \hat{c}_{\alpha 2n} \ldots \hat{c}_{\alpha n1} \hat{c}_{\alpha n2} \ldots \hat{c}_{\alpha nn}$ is the propositional formula.

In the second step, the metric-specific logic compiler generates Java classes that invoke the queries to retrieve the value of an operand and implement the logic of $\chi$ by Java expressions.

Code generation for table-based functions includes the following. Formally, a table-based function can be expressed as:

TABLE I

TABLE-BASED FUNCTION

| Values | Conditions |
|---|---|
| $\lambda_1$ | $c_{11}, c_{12}, \ldots, c_{1n}$ |
| $\lambda_2$ | $c_{21}, c_{22}, \ldots, c_{2n}$ |
| ... | ... |
| $\lambda_m$ | $c_{m1}, c_{m2}, \ldots, c_{mn}$ |

In above table-based function definition, in each row, $c_{i1}, c_{i2}, \ldots, c_{in}$ is a set of conditions defined as a boolean function that can be further defined as:

$$\beta(\lambda_1, \lambda_2, \ldots, \lambda_n, \gamma_1, \gamma_2, \ldots, \gamma_m, \epsilon_1, \epsilon_2, \ldots, \epsilon_k, \epsilon_1, \epsilon_2, \ldots, \epsilon_l) \quad (4)$$

The code generation of this boolean function is similar to that of Expression (1). Further, with each row code generation ready, the model complier can generate the following Java code:

$$\text{boolean } c_{11} = \ldots ; \quad (5)$$

Figure 3:
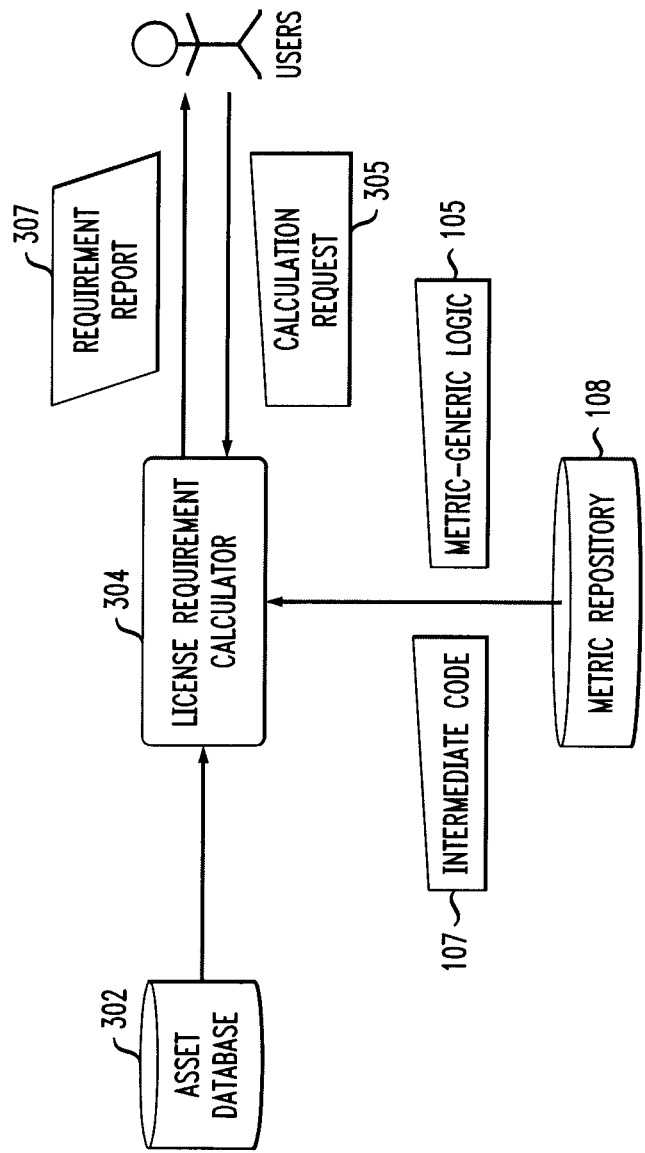
FIG. 3 is a diagram illustrating a license entitlement calculation, according to an embodiment of the present invention.

...

boolean $c_{1n} = \ldots$ ;

if ($c_{11}$ && $c_{12}$ && ... && $c_{1n}$)

return $\lambda_1$;

boolean $c_{21} = \ldots$ ;

...

boolean $c_{2n} = \ldots$ ;

if ($c_{21}$ && $c_{22}$ && ... && $c_{2n}$)

return $\lambda_2$;

...

boolean $c_{m1} = \ldots$ ;

...

boolean $c_{mn} = \ldots$ ;

if ($c_{m1}$ && $c_{m2}$ && ... && $c_{mn}$)

return $\lambda_m$;

FIG. 3 is a diagram illustrating a license entitlement calculation, according to an embodiment of the present invention. By way of illustration, FIG. 3 depicts an asset database 302, which provides input to a license entitlement calculator component 304. Also, metric repository 108 provides intermediate code 107 and metric-generic logic 105 to the license entitlement calculator component 304. Accordingly, as detailed herein, a user provides a calculation request 305 to the license entitlement calculator component 304, and the license entitlement calculator component 304 returns to the user an entitlement report 307.

Figure 4:
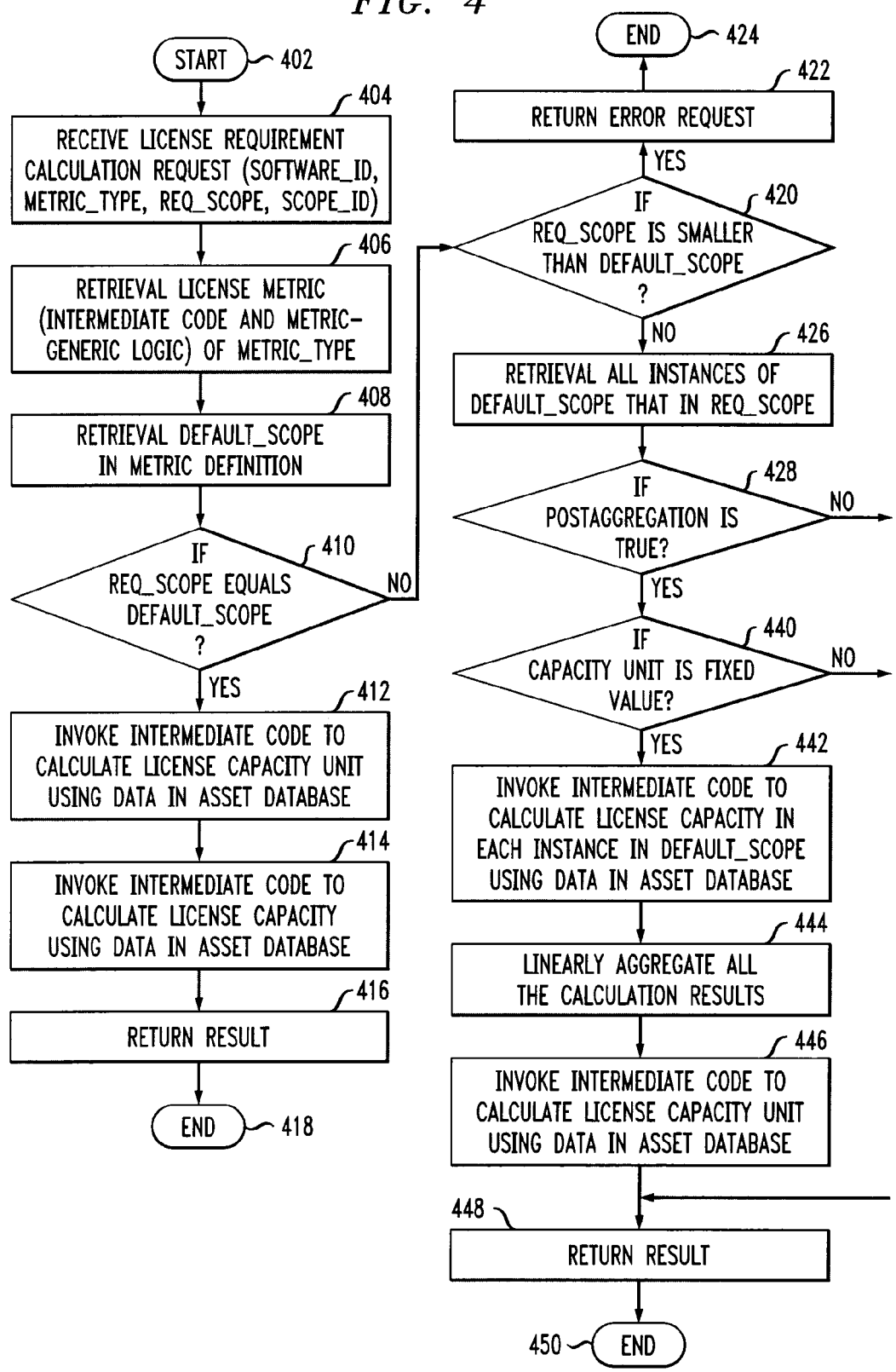
FIG. 4 is a flow diagram illustrating license entitlement calculation, according to an embodiment of the present invention.
Figure 4:
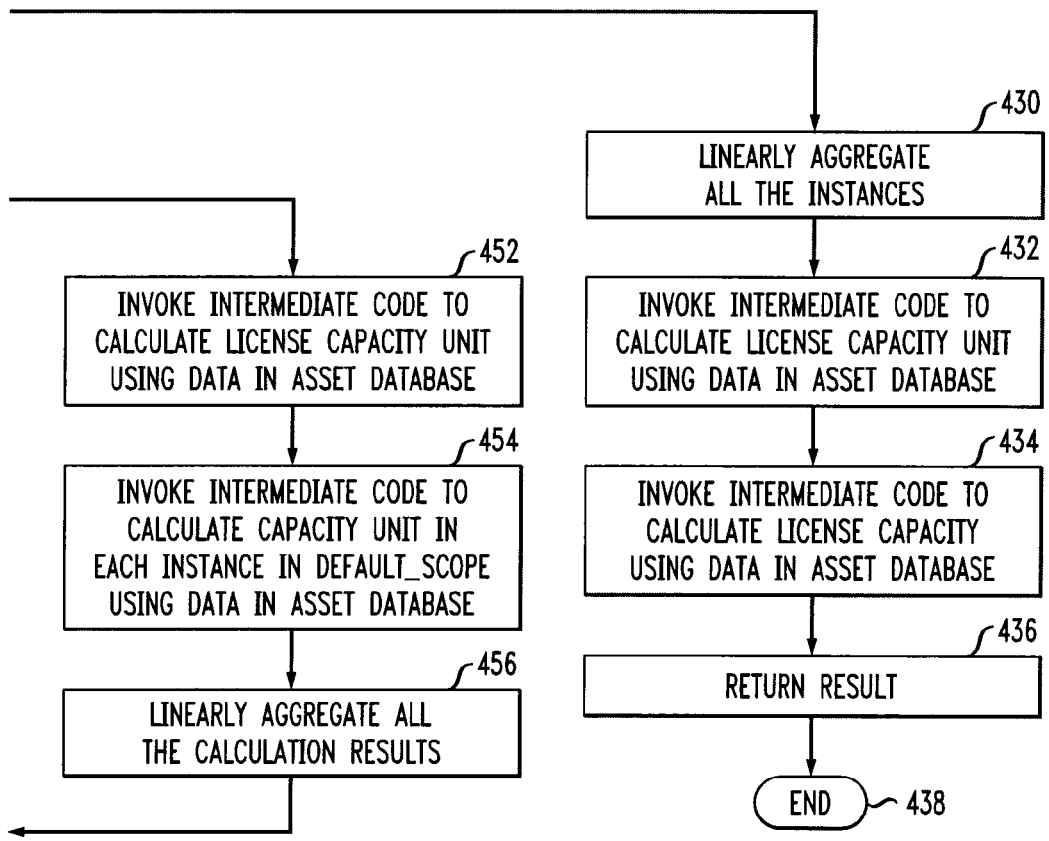

FIG. 4 is a flow diagram illustrating license entitlement calculation, according to an embodiment of the present invention. The process begins at step 402 and continues to step 404, which includes receiving a license entitlement calculation request (software_ID, metric_type, req_scope, scope_ID). Step 406 includes retrieving a license metric (intermediate code and metric-generic logic) of metric_type. Step 408 includes retrieving default_scope in a metric definition. Step 410 includes determining whether req_scope equals default_scope. If yes, then the process proceeds to step 412, which includes invoking intermediate code to calculate a license capacity unit using data in an asset database. Further, step 414 includes invoking intermediate code to calculate license capacity using data in the asset database, step 416 includes returning a result, and the process ends at step 418.

If, however, at step 410, it is determined that req_scope does not equal default_scope, then the process proceeds to step 420, which includes determining if req_scope is smaller than default_scope. If yes (that is, req_scope is smaller than default_scope), then an error request is returned in step 422 and the process ends at step 424. If req_scope is larger than default_scope, the process proceeds to step 426, which includes retrieving all instances of default_scope in req_scope. Further, step 428 includes determining if postAggregation is true. If it is not true, the process proceeds to step 430, which includes linearly aggregating all of the instances. Further, step 432 includes invoking intermediate code to calculate a license capacity unit using data in the asset database, and step 434 includes invoking intermediate code to calculate license capacity using data in the asset database. Subsequently, a result is returned in step 436 and the process ends in step 438.

If it is determined in step 428 that postAggregation is true, then the process proceeds to step 440, which includes determining if the capacity unit is a fixed value. If the capacity unit is a fixed value, the process proceeds to step 442, which includes invoking intermediate code to calculate license capacity in each instance in default_scope using data in the asset database, and step 444, which includes linearly aggregating all of the calculation results. Further, step 446 includes invoking intermediate code to calculate a license capacity unit using data in the asset database, a result is returned in step 448 and the process ends in step 450.

If, however, the capacity unit is not a fixed value, the process proceeds to step 452, which includes invoking intermediate code to calculate a license capacity unit using data in the asset database, and step 454, which includes invoking intermediate code to calculate a capacity unit in each instance in default_scope using data in the asset database. Further, step 456 includes linearly aggregating all of the calculation results, a result is returned in step 448 and the process ends in step 450.

Figure 5:
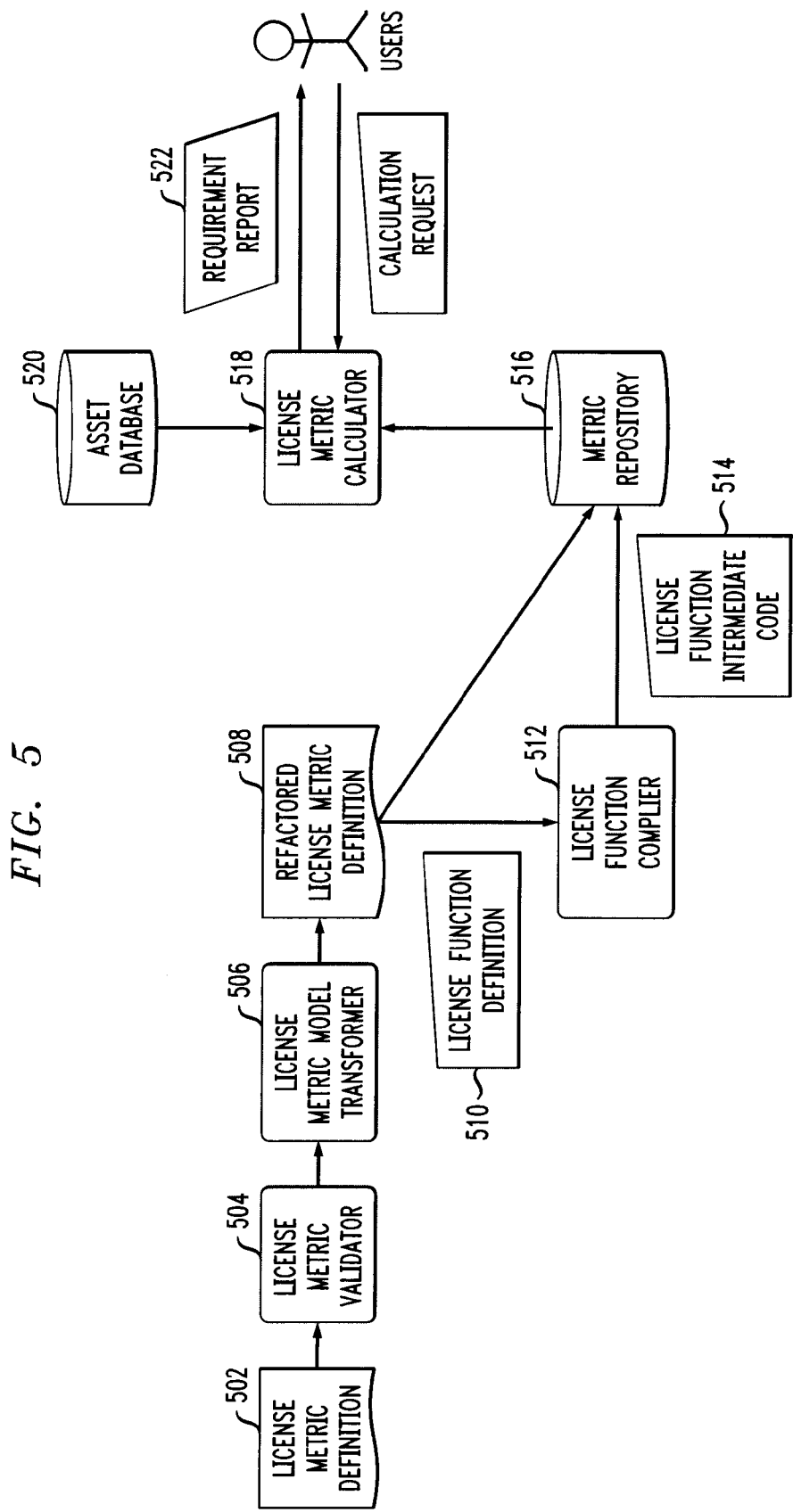
FIG. 5 is a diagram illustrating license metric entitlement calculation, according to an embodiment of the present invention.

FIG. 5 is a diagram illustrating license metric entitlement calculation, according to an embodiment of the present invention. By way of illustration, FIG. 5 depicts a license metric definition 502, which is provided to a license metric validator module 504, which validates the license metric definition 502. Once validated, the license metric definition 502 is provided to a license metric model transformer module 506, which decomposes, transforms and pre-processes the license metric definition 502.

The license metric model transformer module 506 generates a re-factored license metric definition 508, which, along with a license function definition 510, is provided to a license function compiler module 512 (as well as to a metric repository 516). The license function compiler module 512 compiles metric-specific logic to generate intermediate code 514, which the license function compiler module 512 provides to metric repository 516.

Intermediate code from the metric repository 516, as well as information from an asset database 520, is provided to a license metric calculator module 518. Additionally, upon receiving a calculation request (for example, from a user), the license metric calculator module 518 executes intermediate code and generates an entitlement report 522 (which can be provided to the user).

Figure 6:
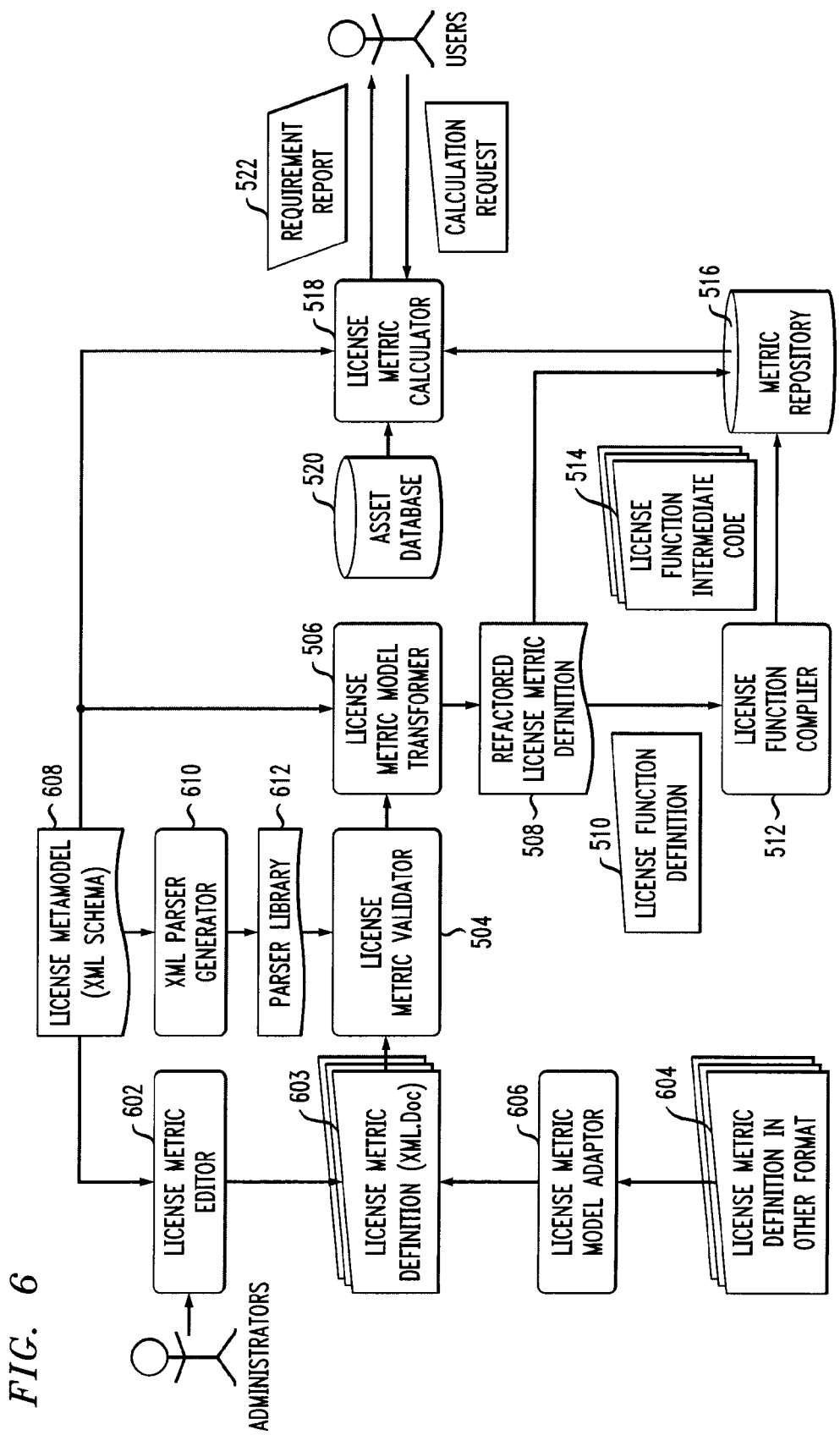
FIG. 6 is a block diagram illustrating an example embodiment, according to an aspect of the invention.

FIG. 6 is a block diagram illustrating an example embodiment, according to an aspect of the invention. By way of illustration, an administrator can provide input to a license metric editor module 602, which can also receive input in the form of a license metamodel (for example, an extensible markup language (XML) schema) 608. The license metric editor module 602 provides input to a license metric definition (for example, an XML document) 603. Additionally, license metric model adaptor module 606, which adapts a license metric definition in a different format 604, also provides input to the license metric definition 603.

The license metric definition 603 is provided to the license metric validator 504, along with a parser library 612 which is generated by an XML parser generator 610 based on input provided thereto in the form of the license meta model 608. The license metric validator validates the license metric definition 603 and, once validated, the license metric definition 603 is provided to license metric model transformer module 506, which decomposes, transforms and pre-processes the license metric definition 603.

The license metric model transformer module 506 generates a re-factored license metric definition 508, which, along with a license function definition 510, is provided to a license function compiler module 512 (as well as to a metric repository 516). The license function compiler module 512 compiles metric-specific logic to generate intermediate code 514, which the license function compiler module 512 provides to metric repository 516.

Intermediate code from the metric repository 516, as well as information from asset database 520, is provided to a license metric calculator module 518. Additionally, upon receiving a calculation request, the license metric calculator module 518 executes intermediate code and generates an entitlement report 522 (which can be provided to a user).

Such as illustrated in FIG. 6, at least one embodiment of the invention includes a hybrid approach for license metric entitlement calculation. Such an approach considers multiple types of logic in license metrics: general logic that can apply to any license metric entitlement calculation (for example, license entitlement aggregate logic), and specific logic that can only apply to an individual license metric entitlement calculation (for example, license unit expression or license capacity expression). Additionally, as noted, at least one embodiment of the invention includes developing a compiler module (such as license function compiler module 512) that generates intermediate code from license metric specific logic. Such intermediate code can be used to execute the license entitlement calculation.

Further, at least one embodiment of the invention includes developing a routing to execute the generic logic for all license entitlement calculations. This can include retrieving and executing related intermediate code for license capacity unit and license capacity, as well as aggregating a result to a requested domain level.

Figure 7:
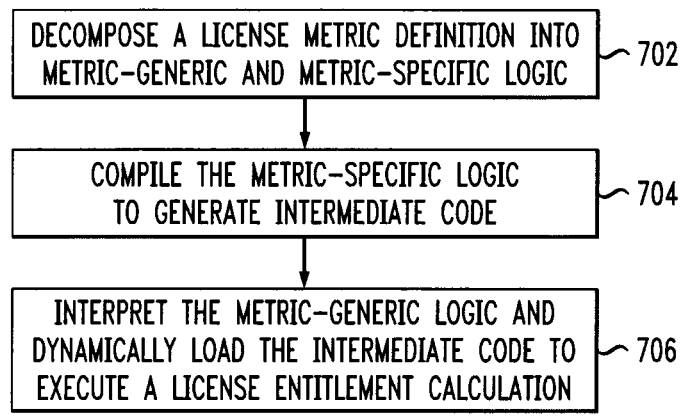
FIG. 7 is a flow diagram illustrating techniques for implementing a model-driven license entitlement calculation, according to an embodiment of the invention.

FIG. 7 is a flow diagram illustrating techniques for implementing a model-driven license entitlement calculation, according to an embodiment of the present invention. Step 702 includes decomposing a license metric definition into metric-generic and metric-specific logic. Metric-specific logic includes logic that is only applicable to an individual license metric entitlement calculation such as, for example, license unit expression and/or license capacity expression.

Step 704 includes compiling the metric-specific logic to generate intermediate code. Step 706 includes interpreting the metric-generic logic and dynamically loading the intermediate code to execute a license entitlement calculation.

The techniques depicted in FIG. 7 can also include creating a new license metric definition. Further, creating a new license metric definition can include using a license meta-model. As also described herein, at least one embodiment of the invention includes adapting a license metric definition in one of multiple formats, as well as validating the license metric definition.

Additionally, the techniques depicted in FIG. 7 can include generating a re-factored license metric definition, and storing the intermediate code in a metric repository. For example, dynamically loading the intermediate code to execute a license entitlement calculation can include dynamically loading the intermediate code from the metric repository to execute the license entitlement calculation. At least one embodiment of the invention can also include incorporating information from an asset database. Further, the techniques depicted in FIG. 7 can include generating an entitlement report.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 8:
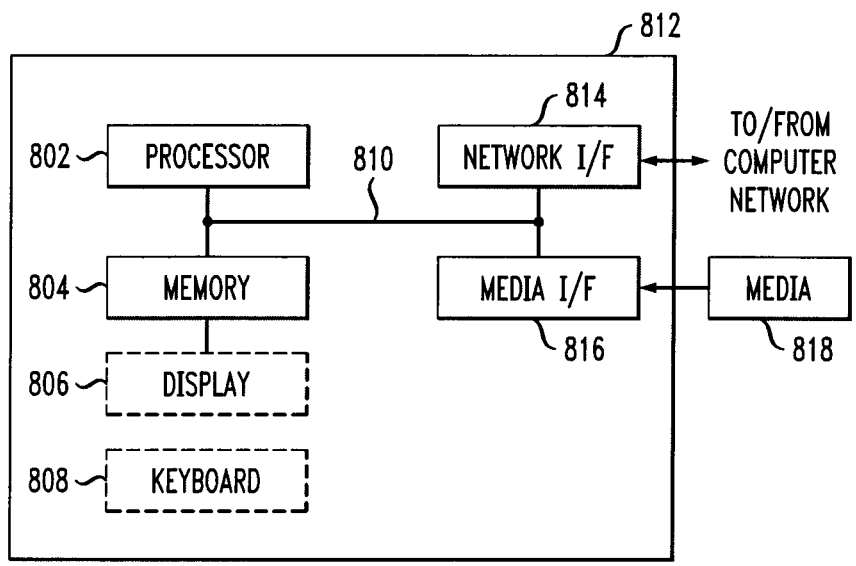
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, adding new or customized license metrics without low level programming.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a license entitlement calculation, the method comprising the following steps:
    decomposing a license metric definition into metric-generic and metric-specific logic;
    compiling the metric-specific logic to generate intermediate code;
    interpreting the metric-generic logic and dynamically loading the intermediate code to execute a license entitlement calculation in response to a user request, wherein said executing the license entitlement calculation comprises:
        defining a capacity unit in a default domain based on said license metric definition;
        calculating capacity in the default domain based on said defined capacity unit;
        aggregating (i) the capacity unit in the default domain and (ii) the calculated capacity in the default domain to a given deployment domain derived from said user request; and
    generating a license entitlement report;
    wherein at least one of the steps is carried out by a computer device.

2. The method of claim 1, wherein metric-specific logic comprises logic that is only applicable to an individual license metric entitlement calculation.

3. The method of claim 2, wherein metric-specific logic comprises license unit expression.

4. The method of claim 2, wherein metric-specific logic comprises license capacity expression.

5. The method of claim 1, comprising:
    creating a new license metric definition.

6. The method of claim 5, wherein creating a new license metric definition comprises using a license meta model.

7. The method of claim 1, comprising:
    adapting a license metric definition in one of multiple formats.

8. The method of claim 1, comprising:
    validating the license metric definition.

9. The method of claim 1, comprising:
    generating a re-factored license metric definition.

10. The method of claim 1, comprising:
    storing the intermediate code in a metric repository.

11. The method of claim 10, wherein dynamically loading the intermediate code to execute a license entitlement calculation comprises dynamically loading the intermediate code from the metric repository to execute the license entitlement calculation.

12. The method of claim 11, comprising:
    incorporating information from an asset database.

* * * * *